United States Patent
O'Connell, Jr.

(10) Patent No.: US 7,406,786 B2
(45) Date of Patent: *Aug. 5, 2008

(54) ANIMATED SIGN ASSEMBLY

(75) Inventor: Charles O'Connell, Jr., Mendon, MA (US)

(73) Assignee: Xerox Corporation, Norwalk, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/434,560

(22) Filed: May 9, 2003

(65) Prior Publication Data

US 2003/0192213 A1 Oct. 16, 2003

Related U.S. Application Data

(63) Continuation of application No. 09/944,860, filed on Aug. 31, 2001, now Pat. No. 6,588,131.

(51) Int. Cl.
*G06F 9/00* (2006.01)

(52) U.S. Cl. .................... 40/446; 40/124.01; 40/427

(58) Field of Classification Search ............. 40/124.01, 40/124.02, 427, 446, 463, 442, 765, 768, 40/776, 734; 345/85, 86, 107; 359/296

See application file for complete search history.

(56) References Cited

U.S. PATENT DOCUMENTS

| | | | |
|---|---|---|---|
| 4,326,349 A * | 4/1982 | Daughtry | ..................... 40/733 |
| 5,020,882 A | 6/1991 | Makow | |
| 5,230,172 A * | 7/1993 | Hsu | ........................... 40/732 |
| 5,282,651 A | 2/1994 | Alonso | |
| 5,351,995 A * | 10/1994 | Booker | ....................... 283/117 |
| 5,723,204 A | 3/1998 | Stefik | |
| 5,922,268 A | 7/1999 | Sheridon | |
| 5,930,026 A * | 7/1999 | Jacobson et al. | ............ 359/296 |
| 6,054,071 A | 4/2000 | Mikkelsen, Jr. | |
| 6,115,724 A * | 9/2000 | Booker | ....................... 715/526 |
| 6,340,965 B1 | 1/2002 | Howard et al. | |
| 6,369,793 B1 | 4/2002 | Parker | |
| 6,573,880 B1 * | 6/2003 | Simoni et al. | .................. 345/87 |
| 6,588,131 B2 * | 7/2003 | O'Connell, Jr. | .............. 40/446 |
| 2002/0030638 A1 | 4/2002 | Parker | |
| 2002/0135558 A1 | 9/2002 | Richley | |

\* cited by examiner

*Primary Examiner*—Joanne Silbermann
(74) *Attorney, Agent, or Firm*—Pillsbury Winthrop Shaw Pittman LLP

(57) ABSTRACT

A sign assembly 10 that implements electronic paper to display an animated image. The sign assembly includes a controller 12, a power supply 14, a pair of substantially transparent, electrically conductive sheets 16, 18, and a sheet of electronic paper 24, which is sandwiched between sheets 16, 18. Image layers 20, 22 are imprinted on the sheets 16, 18, or are alternatively held frictionally adjacent to sheets 16, 18 by a frame assembly 56. Image layers 20, 22 include substantially transparent regions 36, 38, 40 and 42 in which sheet 24 is visible. The conductive sheets 16, 18 are connected to controller 12 which provides an electronic signal which is varied over time resulting in the display of an animated or changing image which may be visible when viewed from one or both sides of the sign assembly 10.

18 Claims, 2 Drawing Sheets

ANIMATED SIGN ASSEMBLY

This application claims priority to and is a continuation of, U.S. patent application Ser. No. 09/944,860 entitled "Animated Sign Assembly" filed Aug. 31, 2001 now U.S. Pat. No. 6,588,131, and incorporates it by reference in its entirety.

FIELD OF THE INVENTION

This invention generally relates to an animated sign assembly and more particularly, to a sign assembly which utilizes electronic paper to provide a selectively animated image in a simple and cost-effective manner.

BACKGROUND OF THE INVENTION

Signs are often used to identify, promote and/or advertise goods and services. Conventional signs typically utilize one or more static or unchanging images to provide advertising or identification of a product or service.

Efforts have been made to integrate electrical components into signs in order to provide animated or dynamic images and advertisements. By way of example, electrically-animated signs have been constructed using arrays of electrically-controlled lights, illuminated gas-filled elements (e.g., neon lights), and electrically-driven moving components. While these prior signs provide limited animation, they are often relatively complex in manufacture and therefore, are relatively expensive to produce. Furthermore, these prior electrically-animated signs typically consume a relatively large amount of electrical power during operation, thereby generating undesirable operating costs. Moreover, the relatively high voltages and currents used to operate these signs can raise fire and safety issues.

There is therefore a need for a new and improved animated sign assembly which overcomes at least some of the drawbacks of prior sign assemblies and which implements electronic paper to provide an animated image in a simple and cost-effective manner.

SUMMARY OF THE INVENTION

A first non-limiting advantage of the present invention is that it provides an animated sign assembly that overcomes some or all of the previously delineated drawbacks associated with prior signs.

A second non-limiting advantage of the present invention is that it provides a sign assembly that displays a selectively animated image in a simple and cost-effective manner.

A third non-limiting advantage of the present invention is that it provides an electrically-animated sign assembly that consumes a relatively small amount of electrical energy.

According to a first aspect of the present invention, a sign assembly is provided. The sign assembly includes a sheet of electronic paper having a color determined by an electric field to which the sheet is subjected; a first conductive sheet disposed on a first side of the sheet of electronic paper; a second conductive sheet disposed on a second side of the sheet of electronic paper, the second conductive sheet being formed such that at least a portion of the sheet of electronic paper is visible; and a source of a varying electric field between the first and second conductive sheets for causing the sheet of electronic paper to change in color.

According to a second aspect of the present invention, an animated sign assembly is provided. The animated sign assembly includes a first conductive sheet which is substantially transparent; a second conductive sheet; an image layer which is disposed over the first conductive sheet and which includes at least one substantially transparent region; at least one piece of electronic paper which is sandwiched between the first and second conductive sheets and visible through the at least one substantially transparent region, the electronic paper having a color which corresponds to an electric field; a voltage source; and a controller which is coupled to the voltage source and to the first and second conductive sheets. The controller provides a varying electric field over a portion of the electronic paper, thereby causing the portion to change in color.

According to a third aspect of the present invention, a method for animating a sign is provided. The method comprises the steps of: forming a portion of the sign from electronic paper having a color related to an electric field; and selectively generating a varying electric field over the electronic paper to cause the electronic paper to vary in color, thereby animating the sign.

These and other features, advantages, and aspects of the invention will become apparent by reference to the following specification and by reference to the following drawings.

DETAILED DESCRIPTION OF A PREFERRED EMBODIMENT OF THE INVENTION

Figure 1:
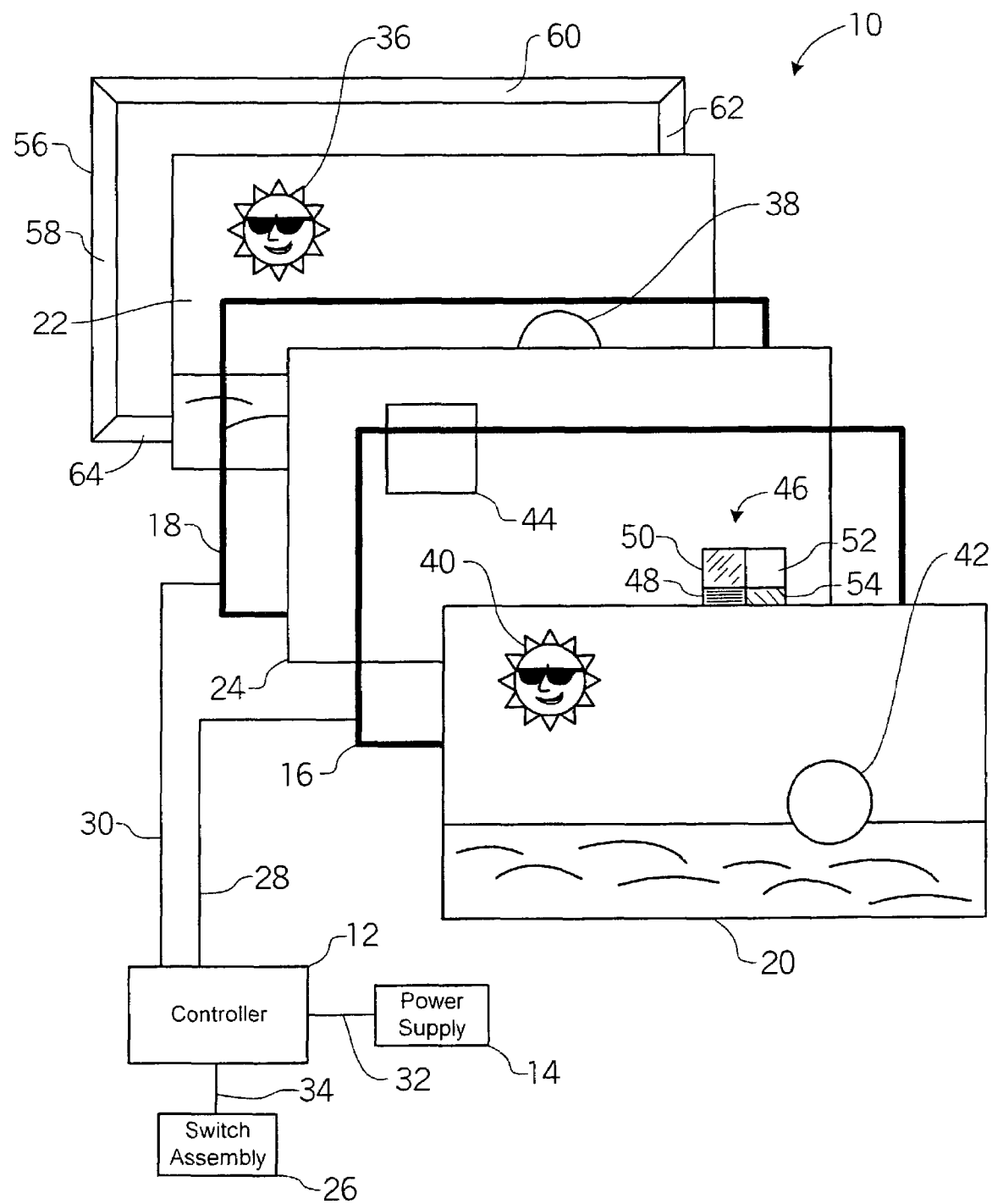
FIG. 1 is an exploded, diagrammatic view of an animated sign assembly in accordance with a preferred embodiment of the invention.
Figure 2:
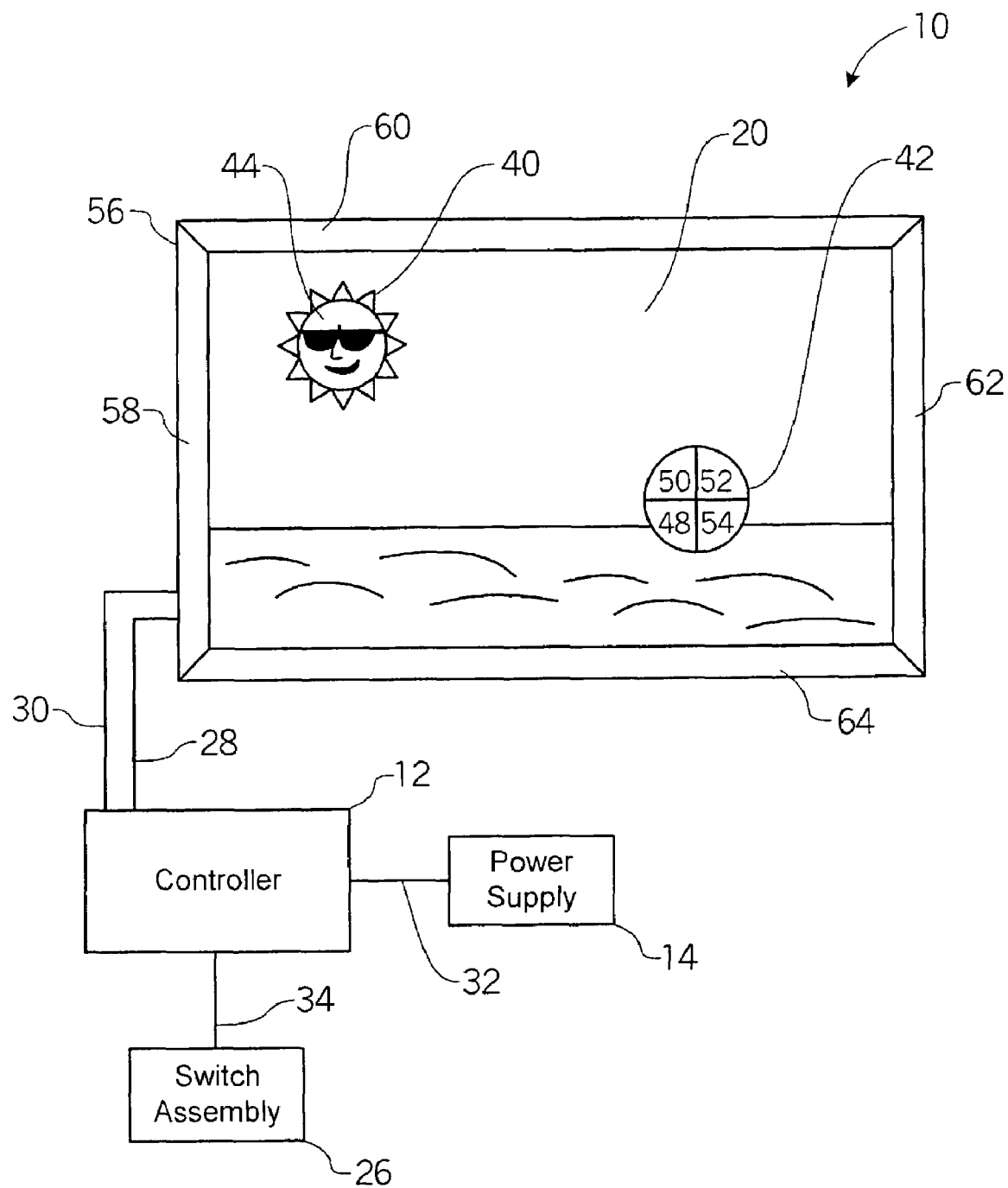
FIG. 2 is an assembled, diagrammatic view of the animated sign assembly shown in FIG. 1.

FIGS. 1 and 2 illustrate an animated sign assembly 10 in accordance with a preferred embodiment of the invention. As shown, sign assembly 10 may include a controller or control module 12, a power supply 14, a plurality, e.g., a pair, of electrically conductive, transparent or translucent sheets 16, 18, and a sheet 24 of electronic paper, which will be described more fully and completely below, and which is sandwiched between sheets 16, 18. A pair of image layers 20, 22 may be selectively printed on, disposed over, or otherwise attached to sheets 16, 18, respectively. In the preferred embodiment, a frame assembly 56 frictionally engages image layers 20, 22 and/or sheets 16, 18, thereby holding together image layers 20, 22, sheets 16, 18 and electronic paper 24. A user-operated control, e.g., a switch assembly 26, may be used to control the sign assembly 10.

In the preferred embodiment of the invention, control module or controller 12 may be a simple electrical circuit comprising conventional circuit components which cooperate to control the operation of sign assembly 10, as will be described more fully and completely below. In other alternate embodiments, controller 12 may include one or more conventional and commercially available microprocessors and/or integrated circuits which operate under stored program control and which cooperatively control the operation of sign assembly 10. Controller 12 is electrically and communicatively coupled to conductive sheets 16, 18 by use of electrical buses 28, 30, respectively. Controller 12 may receive electrical power from power supply 14 by use of electrical bus 32. Controller 12 is further electrically and communicatively coupled to and selectively receives control signals from user-operated switch assembly 26 by use of bus 34. As discussed more fully and completely below, controller 12 selectively provides electrical signals to conductive sheets 16, 18 by use of buses 28, 30, to vary the electric field between conductive sheets 16, 18. In the preferred embodiment, controller 12 may utilize one or more conventional voltage regulators to selectively alter the voltage signal provided to buses 28, 30 in accordance with the control signals received from switch assembly 26.

In the preferred embodiment, each sheet 16, 18 may be a relatively thin sheet manufactured from a conventional and substantially transparent conductive material, such as electrically conductive glass or plastic. Image layers 20, 22 are preferably made from a nonconductive material (e.g., plastic) and may be printed on, disposed over, or otherwise applied or attached to sheets 16, 18, respectively. In the preferred embodiment, image layers 20, 22 may be selectively inserted into and removed from (e.g., slid into and out of) frame assembly 56. Image layers 20, 22 may include several substantially transparent "windows" or regions 36, 38, 40 and 42. The remaining areas or regions of image layers 20, 22 are preferably colored and form an aesthetically pleasing design, picture or advertisement. In the preferred embodiment shown in FIG. 1, the image layers 20, 22 depict a beach scene, the regions 36 and 40 are each shaped or designed to represent a sun, and the regions 38 and 42 are each shaped or designed to represent a beach ball. In other alternate embodiments, different and/or additional transparent "windows" may be formed within the image layers 20, 22 based upon the desired advertisement or picture to be displayed by sign assembly 10. Additionally, in other embodiments, sign assembly 10 may be "one-sided," with only one of sheets 16, 18 being substantially transparent and including an image.

Sheet 24 may be manufactured from one or more pieces of electronic paper, having many electrically-charged microcapsules that are effective to alter the color of the sheet 24 based on the polarity of the electrical field applied to the sheet. In the preferred embodiment, the sheet 24 is made from one or more pieces of SmartPaper™ which is distributed by Gyricon Media, Inc. of Palo Alto, Calif. In the example shown in FIG. 1, sheet 24 may include non-overlapping sections 44, 46 which are made from electronic paper having color characteristics designed to correspond with the images of regions 36, 38, 40 and 42. In the preferred embodiment, section 44 is made from electronic paper having an orange/red color combination. That is, section 44 is made from electronic paper which has either an orange color or a red color depending on the polarity of the voltage or electric field over sheet 24. Section 46 includes several wedges or subsections 48, 50, 52 and 54 which each may comprise a unique color combination, such as black/white, dark blue/bright blue, dark yellow/bright yellow and dark red/bright red. Sections 44, 46 may be individually set or placed within areas which have been excised from sheet 24, or alternatively, sections 44, 46 may be integrally formed with sheet 24. Sheet 24 is sandwiched between conductive sheets 16, 18, which abuttingly engage each side of sheet 24. When assembled, regions 36, 38, 40 and 42 act as "windows" through which sections 44 and 46 are visible. It should be appreciated that conductive sheets 16, 18 and electronic paper sheet 24 may be of virtually any size, depending on the desired medium of advertisement. Additionally, sheets 16, 18 and 24 may also comprise or be incorporated into a portion of a larger sign or advertisement.

Power supply 14 may be a conventional power supply that may include one or more batteries, solar cells, or other suitable direct and/or alternating current power sources. Supply 14 provides electrical power to controller 12 which cooperates with the power supply 14 to provide a varying source of electrical power to sheets 16, 18. In the preferred embodiment, user-operated switch assembly 26 is a conventional electrical switch assembly that allows a user to selectively activate and deactivate sign assembly 10, and to control the rate at which controller 12 varies the polarity and strength of the voltage over buses 28 and 30. Particularly, switch assembly 26 communicates signals to controller 12, effective to cause the controller 12 to selectively activate the sign assembly 10 by generating a voltage over busses 28 and 30, to deactivate the sign assembly 10 by removing any voltage over busses 28 and 30, and to control the rate of animation of the sign assembly 10 by varying the rate of change of the voltage over buses 28 and 30.

Frame assembly 56 may include several members 58, 60, 62 and 64 that are formed from a nonconductive material (e.g. plastic or glass). Members 58, 60, 62 and 64 may be coupled together in a conventional manner, such as by use of conventional fasteners or adhesive material. Frame assembly 56 is disposed around sheets 16, 18, and 24 and image layers 20, 22 and frictionally engages sheets 16, 18 and/05 image layers 20, 22, thereby holding together sign assembly 10. In alternate embodiments, sheets 16, 18 an 24 and image layers 20, 22 may be held together in any suitable and/or conventional manner.

In operation, sign assembly 10 may be used as a dynamic medium of advertisement, and may be placed within or outside of a retail store or other place of business. For example, the embodiment of sign assembly 10, which is shown in FIG. 1, may be used as an advertisement for a brand of suntan lotion. In such an embodiment, image layers 20, 22 may include a blue sky and sandy beach, as well as any other desirable picture elements. Substantially transparent sections 36, 40 are designed in the form of a sun, and paper section 44 is viewable through these sections 36, 40 (see FIG. 2), thereby effectively providing color to the displayed sun. Substantially transparent sections 38, 42 are designed in the form of a beach ball, and paper section 46 is viewable through these sections 38, 42 (see FIG. 2), thereby effectively providing color to the displayed beach ball.

In order to activate the animated sign assembly 10, a user operates switch assembly 26, which is effective to cause signal controller 12 to apply a varying voltage over buses 28, 30. Particularly, the magnitude and polarity of the voltage across bus 28 and bus 30 is selectively varied. This causes the electric field between conductive sheet 16 and conductive sheet 18 (i.e., across sheet 24), to likewise vary and change in polarity. This varying electric field causes the electronic paper sheet 24 to continuously change color at the rate the electric field changes in polarity. The rate at which the polarity of the electric field is altered and reversed is set by the controller 12, and can be selectively adjusted (i.e., increased or decreased), through user-operated switch assembly 26.

The varying voltage across sheet 24 animates the image layers 20, 22, and more particularly, the portions of the images representing the sun and beach ball (i.e., the images represented by regions 36, 38, 40 and 42). That is, an observer will view the electronic paper changing color through the "windows" in the image layers 20, 22 (i.e., regions 36, 38, 40 and 42). In this manner, the sun represented by regions 36 and 40 will appear to be burning or changing in intensity, i.e., alternating in color between orange and red. The beach ball represented by regions 38 and 42 will likewise change in color. That is, in response to the varying electric field, the electronic paper within regions 48, 50, 52 and 54 will respectively alternate in color between black and white, dark blue and bright blue, dark yellow and bright yellow, and dark red and bright red. These color changes are visible through the "windows," making the sun and ball appear to continuously change in color. In other alternate embodiments, different and/or additional regions having different color combinations may be incorporated into sign assembly 10 based on the desired image or advertisement, thus animating other portions of the sign assembly 10. In one alternate embodiment, the image layers 20, 22 may be removably attachable to conductive sheets 16, 18, thereby allowing the displayed image to be selectively changed, allowing for great flexibility in use of the invention.

It should be appreciated that animated sign assembly 10 provides significant advantages over prior animated sign assemblies. For example and without limitation, the amount of electrical power consumed by the assembly is relatively small since only relatively small fluctuations in electric field are required to change the color of the electronic paper used to manufacture sheet 24. Furthermore, sign assembly 10 has a simple design, thereby making the assembly relatively easy and inexpensive to manufacture. Additionally, in contrast to prior electrically-operated signs, the relatively low voltages and currents used by assembly 10 do not pose any significant fire or safety hazards.

While the foregoing has been with respect to a preferred embodiment of the invention, it will be appreciated by those skilled in the art that changes may be made in this embodiment without departing from the principles and spirit of the invention, the scope of which is defined by the appended claims.

What is claimed is:

1. An electrically animated sign assembly that enables two-sided display of an image to be animated, the sign assembly comprising:
   a plurality of electronic papers of various sizes and colors, inserted at various positions between a first conductive sheet and a second conductive sheet in which both the first and second conductive sheets are substantially transparent to enable two-sided viewing of the electronic papers;
   at least two nonconductive image layers or sheets each including a substantially transparent region representing an image to be animated and through which at least a portion of said electronic papers is visible, the at least two image layers or sheets including first and second image layers or sheets removably affixed on opposing sides of the first and second conductive sheets in coordination with the position of the electronic papers;
   wherein the substantially transparent regions of the first and second image layers or sheets include at least one pair of the substantially transparent regions aligned with one another and with at least one shared and common electronic paper of the plurality of electronic papers therebetween, thus enabling two-sided viewing of the shared and common electronic paper and simultaneous animation of the images represented by the aligned substantially transparent regions during activation of the shared and common electronic paper;
   wherein the conductive sheets are coupled to a controllable voltage source for generating an electric field across the electronic papers, and the electric field is selectively varied in strength and polarity so as to animate the image by effecting a continuous visible color change in the portions of said electronic papers that are visible through said substantially transparent regions; and
   a frame assembly disposed around said one or more nonconductive image layer or sheet and conductive sheets to hold said one or more nonconductive image layer or sheet and conductive sheets together.

2. The sign assembly of claim 1, further comprising a switch assembly coupled to said controlled voltage source to selectively activate and deactivate said animated sign assembly.

3. The signal assembly of claim 2, wherein said switch assembly is effective to selectively control the rate at which said voltage is varied.

4. The sign assembly of claim 3, wherein said switch assembly is effective to selectively control the rate at which the polarity of said voltage is varied.

5. The sign assembly of claim 4, wherein said switch assembly is effective to selectively control the rate at which the polarity and magnitude of said voltage is varied.

6. The sign assembly of claim 1, wherein said one or more image layer or sheet comprises a layer of nonconductive material printed on said conductive sheet.

7. The sign assembly of claim 1, wherein the visible color change comprises controlled voltage-dependent changes from an orange color to a red color, black to white, dark blue to bright blue, dark yellow to bright yellow or dark red to bright red.

8. The sign assembly of claim 1, wherein the image layer is selectively inserted and removed from said frame assembly.

9. The sign assembly of claim 1, wherein the visible color change is continuous for a sign animation effect.

10. The sign assembly of claim 1, wherein the electronic papers comprise different regions displaying different visible color effects.

11. The sign assembly of claim 1, wherein the first image and the second image are different from one another.

12. The sign assembly of claim 1, wherein the first image and the second image are different, but complementary to one another.

13. A method for displaying an image to be animated in a two-sided sign assembly, the method comprising:
    sandwiching a plurality of electronic papers of various sizes and colors in the sign assembly at different positions between a first substantially transparent conductive sheet and a second substantially transparent conductive sheet enable two-sided viewing of the electronic papers;
    attaching at least two image layers or sheets on opposing sides of the conductive sheets, said one or more image layers or sheets each including a substantially transparent region representing an image to be animated and through which at least a portion of said electronic papers is visible;
    wherein the substantially transparent regions of the first and second image layers or sheets include at least one pair of the substantially transparent regions aligned with one another and with at least one shared and common electronic paper of the plurality of electronic papers therebetween, thus enabling two-sided viewing of the shared and common electronic paper and simultaneous animation of the images represented by the aligned substantially transparent regions during activation of the shared and common electronic paper;
    wiring the conductive sheets separately to a selectively controllable voltage source;
    securing said one or more nonconductive image layer or sheet and conductive sheets in a frame assembly; and
    animating the image by activating an electric field that causes the electronic papers to continuously vary their color within the substantially transparent region in relation to its controllably applied voltage strength and polarity.

14. The method of claim 13, wherein the colors are changed from an orange color to a red color, black to white, dark blue to bright blue, dark yellow to bright yellow or dark red to bright red.

15. The method of claim 13, wherein said attaching the one or more image layer or sheet to the conductive sheets is followed by detaching the one or more image layer or sheet.

16. The method of claim 13, wherein said activating an electric field includes selectively varying the electric field across the electronic papers by selectively controlling the rate at which said voltage between the first and second conductive sheets is varied.

17. The method of claim 16, wherein said selectively controlling the rate of change includes controlling the rate at which the polarity and magnitude of said voltage is varied between the first and second conductive sheets.

18. The method of claim 13, in which the one or more image layer or sheet further comprises a non-transparent region forming an aesthetically pleasing design, picture or advertisement.

* * * * *